United States Patent
De Muelenaere et al.

(10) Patent No.: US 8,699,100 B2
(45) Date of Patent: Apr. 15, 2014

(54) AUTONOMOUS SHEET-FED SCANNER

(75) Inventors: Pierre De Muelenaere, Court-Saint-Etienne (BE); Michel Dauw, Machelen (BE); Olivier Dupont, Sombreffe (BE); Patrick Verleysen, Wavre (BE)

(73) Assignee: I.R.I.S., Mont-Saint, Guibert (BE)

( * ) Notice: Subject to any disclaimer, the term of this patent is extended or adjusted under 35 U.S.C. 154(b) by 75 days.

(21) Appl. No.: 13/023,666

(22) Filed: Feb. 9, 2011

(65) Prior Publication Data
US 2011/0249306 A1    Oct. 13, 2011

(30) Foreign Application Priority Data

Feb. 9, 2010 (BE) .................................. 2010/0067

(51) Int. Cl.
*H04N 1/46*    (2006.01)
*B65H 33/04*    (2006.01)
*H04N 1/04*    (2006.01)

(52) U.S. Cl.
USPC ........... 358/498; 358/474; 358/488; 358/496; 270/58.08; 382/243

(58) Field of Classification Search
USPC ............... 358/474, 498, 473, 497; 270/58.08; 382/243
See application file for complete search history.

(56) References Cited

U.S. PATENT DOCUMENTS

| 5,278,673 | A | 1/1994 | Scapa |
| 5,342,034 | A * | 8/1994 | Mandel et al. ............. 270/58.08 |
| 6,031,636 | A | 2/2000 | Chen |
| 7,836,183 | B1 * | 11/2010 | Barnett et al. ................ 709/226 |
| 8,068,684 | B2 * | 11/2011 | Dauw et al. .................... 382/243 |
| 2002/0169509 | A1 | 11/2002 | Huang |
| 2005/0225810 | A1 | 10/2005 | Sun |
| 2006/0001920 | A1* | 1/2006 | Moreno et al. ................ 358/498 |
| 2006/0103893 | A1 | 5/2006 | Azimi |

FOREIGN PATENT DOCUMENTS

| WO | 2008/003119 A1 | 1/2008 |
| WO | 2008/055365 A1 | 5/2008 |

* cited by examiner

*Primary Examiner* — Akwasi M Sarpong
(74) *Attorney, Agent, or Firm* — Jerold I. Schneider; Schneider Rothman IP Law Group

(57) ABSTRACT

Battery-powered portable sheet-fed scanner, comprising: a scanning unit (21-23) for scanning documents and forming digital representations thereof; a sheet feeder (28) for feeding a document past the scanning unit; a processor (20), communicatively connected to the scanning unit and provided for controlling the scanning operation; a plurality of embedded storage capabilities, each of which is communicatively connected to the processor and each of which comprises either an internal memory (26) for internally storing the digital representations or a communication link (24; 25) to an external storage medium for externally storing the digital representations. The processor is provided with an embedded routing application which is provided for routing the digital representations to a predetermined selection among the embedded storage capabilities.

15 Claims, 6 Drawing Sheets

AUTONOMOUS SHEET-FED SCANNER

CROSS-REFERENCE TO RELATED APPLICATION

This application claims priority to Belgian Patent Application No. 2010/0067 filed Feb. 9, 2010, which is hereby incorporated by reference in its entirety.

TECHNICAL FIELD

This invention relates to a portable sheet-fed scanner and its use.

BACKGROUND ART

A scanner is a device connected to a computer that converts a document into a digital image that is transferred to the computer. The most common scanner is the flatbed scanner where the document is placed on a glass window for scanning, but there exist also other scanners such as the sheet-fed scanner.

With the sheet-fed scanners, the document is carried along by a motor, like in the case of a fax machine. It is the document that moves and not the sensors or the glass pane. The advantages of sheet-fed scanners are their compactness and portability. Examples of sheet-fed scanners are the IRIScan™ and IRISCard™ developed and commercialized by I.R.I.S. SA.

The IRIScan™ is a compact and light-weight scanner able to scan A4 pages in color. It is connected to a computer through an USB cable. It comes with a text recognition software (runs on the computer, not on the scanner) that allows to convert the image of the scanned document into a file readable by a word-processor (e.g. Microsoft Word) or a file intended for archiving (e.g. the PDF format of Adobe).

The IRISCard™ is a compact and light-weight scanner able to scan business cards in color. It is connected to a computer through an USB cable. It comes with a business card recognition software (runs on the computer, not on the scanner) that captures the information they contain and creates electronic contacts to be sent to a contact manager, such as Microsoft Outlook.

In order to function, these types of scanners have to be connected to a running computer, through a cable or by means of a wireless technology.

DISCLOSURE OF THE INVENTION

It is an aim of the invention to present a portable sheet-fed scanner which does not show at least one drawback of the prior art.

This aim is achieved with the scanner showing the technical features of the first claim.

The scanner of the invention is battery powered and has embedded storage capabilities. It comprises, for example, internal memory (such as flash memory) and/or connects to at least one external and/or removable memory (such as SD cards, USB stick, Bluetooth or Wi-Fi link to standalone or network drive). The scanner of the invention has a processor which is provided with an embedded routing application, i.e. in a format executable on the processor of the scanner itself, which has software code portions provided for routing the digital representations to a predetermined selection among the embedded storage capabilities. This allows to use the scanner as an autonomous device (no computer and no power cable required) and to store the documents in these different internal or removable memories according to predetermined settings.

In preferred embodiments, the scanner of the invention also allows to transfer the images to any kind of computer (independently of the Operating System) by:
- selecting the appropriate storage medium which is recognizable by the computer,
- connecting/associating the medium to the scanner,
- scanning and storing the documents on that medium connected/associated with the scanner
- importing the scanned documents stored on the medium into the computer (e.g. by removing the USB stick/SD card from the scanner and connecting it to the computer; or by linking the computer to the network storage media).

With this process, it is not necessary to have a computer to scan, and it is not necessary to transport the computer or even to transport the scanner, since only the removable media can be transported. Also, it is possible to select the appropriate storage media which corresponds best to the target computer and the target Operating System.

In preferred embodiments, the scanner comprises an internal storage (such as for example a flash memory) that can be accessed through a standard USB connection, an external SD Card slot or USB slots for connecting USB memory sticks.

Also in preferred embodiments, a wireless connection capability is integrated in the device, to replace for example the USB connection to the target computer by a wireless connection.

In a preferred embodiment, the connection can be through a Bluetooth or a Wi-Fi connection.

In preferred embodiments, an application is embedded in the scanner which comprises software code portions, in a format executable by the processor of the scanner, for sorting the scanned documents at the scanning time and storing different types of documents on different storage media. This makes it possible that the user scans documents for different persons without mixing them up, or scans different types of documents (e.g. business cards and invoices) without mixing them up, as the sorting application detects the person or the document type and thereupon stores the images of the scanned documents on different storage media, according to preferences/user settings. The ultimate goal is to be able to store different kinds of documents on different storage media and to deliver these different kinds of documents to different people.

This sorting operation performed on the scanner device itself can be done according to simple or complex rules. One example of a simple rule is assigning a priority to each storage device. For instance, the memory stick can have the highest priority, then the SD card, then the internal flash memory. So when all the storage devices are connected, all documents are sent to the memory stick, if not, the documents are sent to the SD-Cards and if no removable storage is connected to the scanner, all documents are sent to the internal flash memory of the scanner. There can be more complex rules based on the size of the scanned documents or based on properties and content of the documents, by using automatic identification technologies (such as the Fingerprint™ technology from I.R.I.S. SA) or other.

One typical example of such a sorting application is to store all scanned business cards on one memory to be later processed on a PC, all scanned professional letters on another memory to be later processed on a Macintosh, all scanned pictures on another medium to be downloaded to a photoframe and to store scanned invoices on yet another storage medium, e.g. transferred by Bluetooth to a Smartphone.

In preferred embodiments, the processor is provided with an application to perform document hyper compression (for example such as the hyper compression described in US2008273807 A1, incorporated herein by reference in its entirety) and/or OCR to the scanned documents and to generate sophisticated document formats (such as for example PDF or XPS) which contain both the image and the text. This can then be performed on the scanner itself, i.e. independent from a computer or any computer Operating System.

In a first preferred embodiment, the scanner is equipped with a microcomputer able to run embedded programs for performing document hyper compression, OCR and/or PDF generation, during the scanning or just after the scanning, and storing the compressed file and an OCR result in one of the available storage capabilities.

In another preferred embodiment this process can be performed in a transparent way on the computer at the time the removable storage is connected to the computer.

The invention further relates to a computer system comprising a scanner according to one of the above described embodiments in combination with a computer having a document scanning application (e.g. OCR, Business card reading, document management, invoice recognition software, or other), provided for being executed on the computer and comprising wake up capabilities for detecting when a removable storage medium that contains documents scanned with the portable scanner is connected to the computer. The wake up capabilities are provided for starting pre-defined operations upon loading them from the removable storage medium into e.g. an internal storage medium of the computer, such as for example additional processing (e.g. hyper compression, image enhancement, . . . ) of the images, user interactions (e.g. manual selection of document types, additional indexing of documents, additional processing of portions of the documents, . . . ). These operations can be fully performed by the document scanning application (so without user interaction), or can be user assisted.

In a preferred embodiment, all the documents on the media storage are stored in a way that clearly identifies how they have been stored (for instance, the storage location on the scanner which is indicated with a special folder name) and/or the type of documents that was scanned (document or business card, identified with different document prefix names or different tags in the files) and/or the processing that was done on the scanner (for instance with tags or meta-data in the files).

The document scanning application is preferably provided with capabilities to watch the different removable storage locations of the computer and to interpret and recognize tags of the documents and the images that were generated by the scanner. This means that the document scanning application is capable of retrieving which processing steps have been performed on the scanner in a remote location and continuing the processing with knowledge of all the processing steps already performed.

In preferred embodiments of the scanner, the operation is provided with preferences/parameters/settings with which the images and/or documents generated by the portable scanner can be optimized in view of reaching a suitable compromise between speed, storage space and document quality.

DETAILED DESCRIPTION OF THE PREFERRED EMBODIMENT

Figure 1:
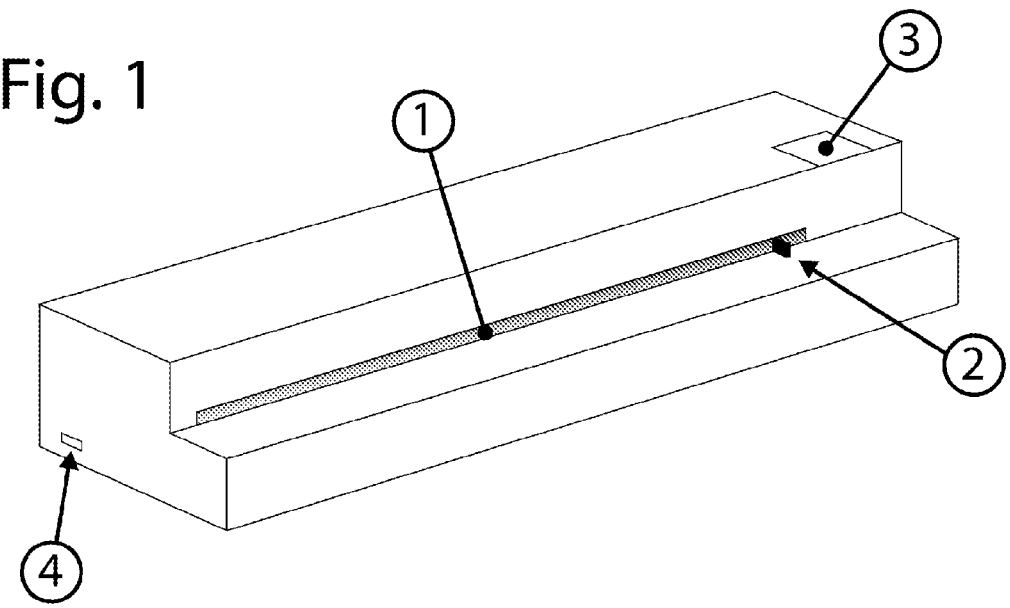
FIG. 1 shows an external view of a sheet-fed scanner of the present invention.
Figure 2:
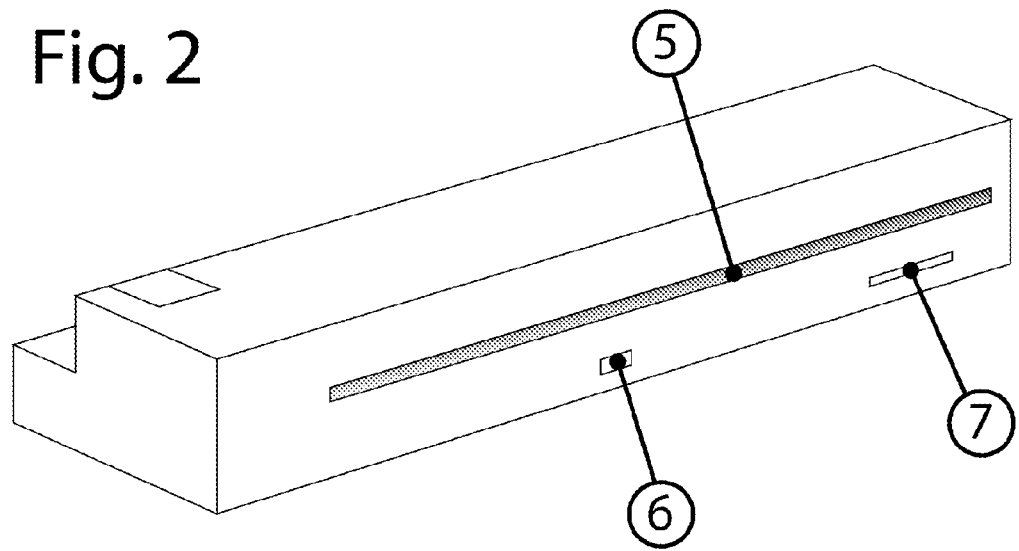
FIG. 2 shows the connections on the rear side of this scanner.

FIG. 1 shows an external view of a sheet-fed scanner of the present invention and FIG. 2 shows the connections on the rear side of the scanner. The scanner has a Power ON/OFF button and Operating status indicators (3). The scanner has to be Powered ON to be in operation. The user has to feed the paper of the document he wants to scan into the Document feeding slot (1). A sensor senses the presence of the paper and the paper is carried along by the scanner motor. The page is scanned line by line by Contact Image Sensors (CIS), converted into a digital image, compressed and transmitted to the scanner internal memory. The paper is output through the Document output slot (5). A paper guide (2) may be adjusted to the paper dimension in order that the paper doesn't skew during the scanning. The user may scan multiple pages that will be stored in the local memory. In the preferred embodiment, the local memory has a capacity of 512 Mbytes. That allows the storage of about 400 A4 pages. The scanner can be also connected to a computer through the USB connector to host (4). The computer will then mount automatically the scanner local memory as a standard memory device (removable disk) and the image files can be accessed. Note that no specific device driver has to be installed on the computer beforehand and so the image files can be accessed by computers having different Operating Systems (Windows, Macintosh, Unix, Linux, . . . ). The scanner is equipped with a battery that gives the power. This battery is charged by the Power charge connector (4) coupled with the USB connector to host. The battery can have a capacity which allows to scan more than 100 A4 pages without recharging. When an USB memory stick is inserted into the USB memory connector (6), the compressed image is not stored into the local memory but in the USB memory stick. When an SD/xD/MMC/MS memory card is inserted into the card connector (7), the compressed image is not stored into the local memory (or connected USB memory stick) but in the SD/xD/MMC/MS memory card.

When the scanner power is on, the power button can also be used to change the scanning resolution.

The operating status indicators have lightning patterns that indicate that:
  The scanner is power ON or OFF.
  The battery is charged, being charged or the battery power is low.
  The scanner is ready or busy scanning and storing image file.
  The local memory (or USB memory stick, or memory card) has free space or is nearly full.

Figure 3:
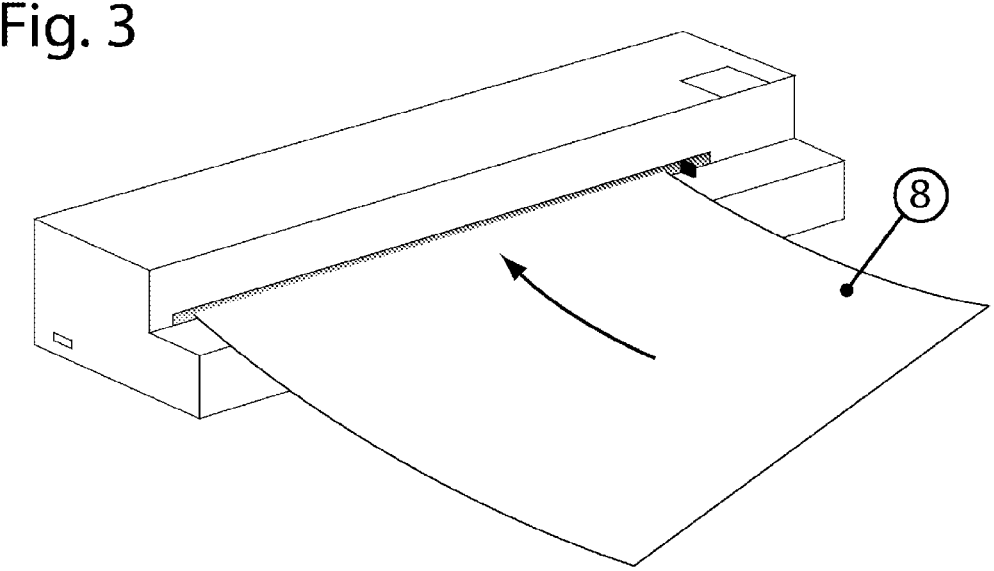
FIG. 3 shows the scanning of a document page.
Figure 4:
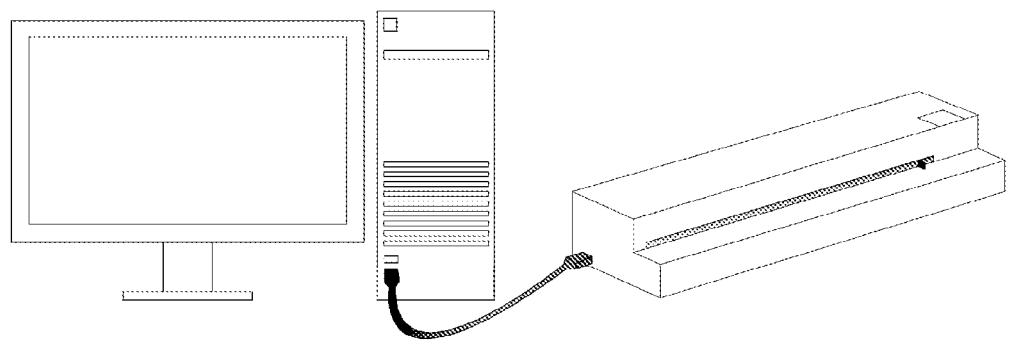
FIG. 4 shows the transmission of the scanned images stored in the scanner local memory by using an USB cable.

FIG. 3 shows the scanning of a document page (8) without a computer connected. The user may take his scanner with him while travelling and scanned several documents he is interested in. Back home, he can connect his scanner to his computer and process the scanned documents (FIG. 4).

Figure 5:
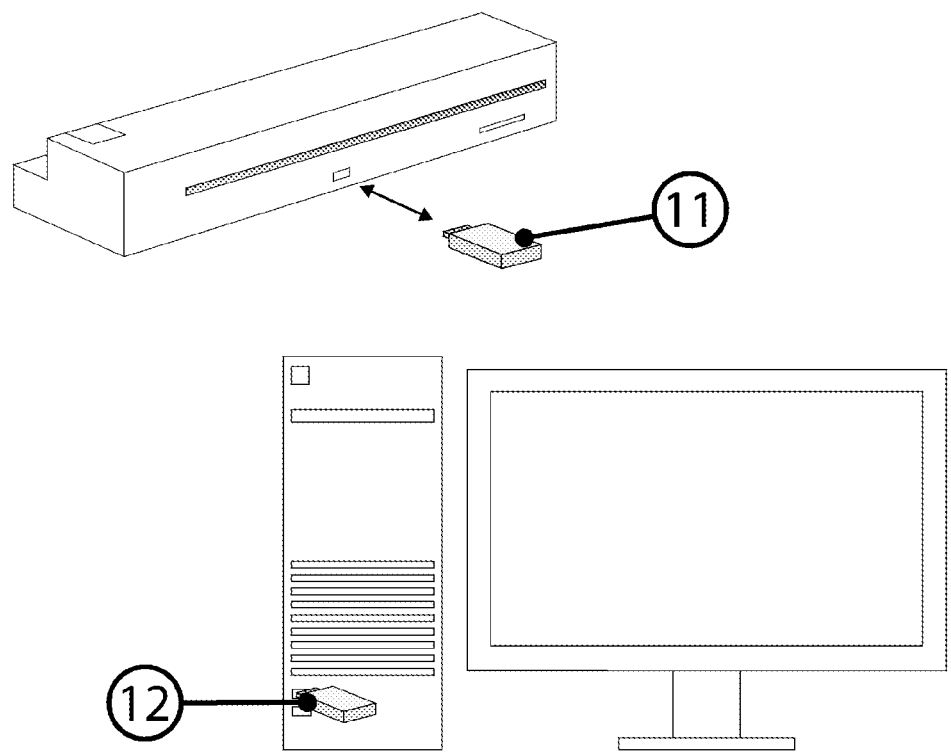
FIG. 5 shows the transmission of the scanned images by means of an USB memory stick.

The user may also use the scanner by inserting his USB memory stick into the scanner (11). He can scan several documents, store them on the USB stick and take back only the USB memory stick to a computer (12), where he inserts the USB stick for processing, storing or archiving the scanned documents (FIG. 5).

Figure 6:
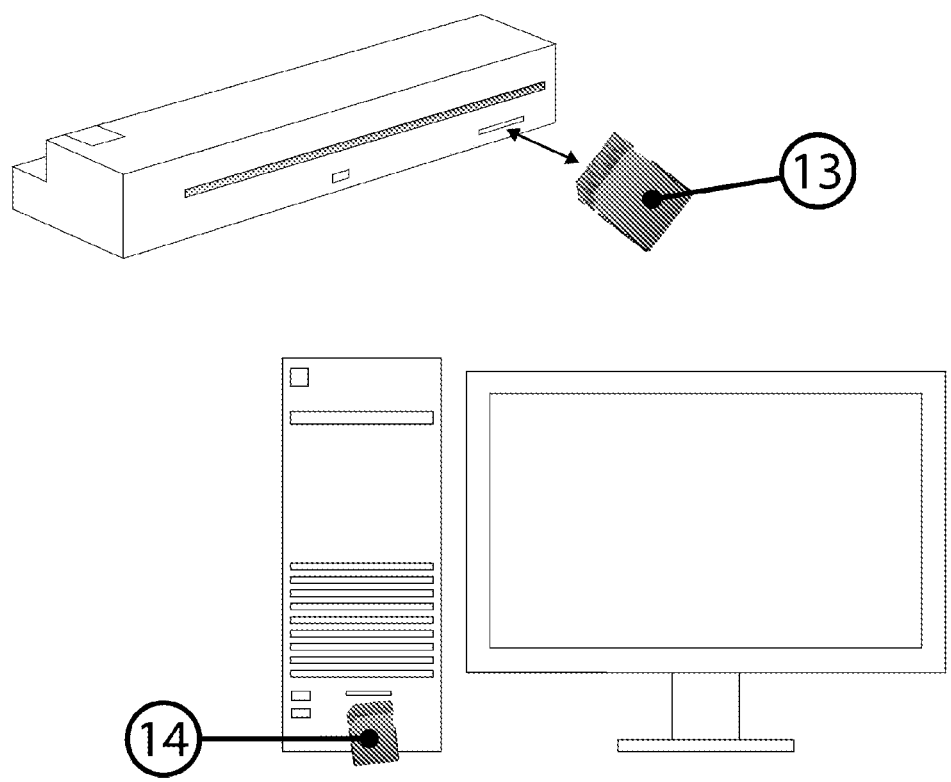
FIG. 6 shows the transmission of the scanned images by means of an SD card.

The user may also use the scanner by inserting his memory card into the scanner (13). He can scan several documents, store them on the memory card and take back only the memory card to a computer (14), where he inserts the memory card for processing, storing or archiving the scanned documents (FIG. 6).

Figure 7:
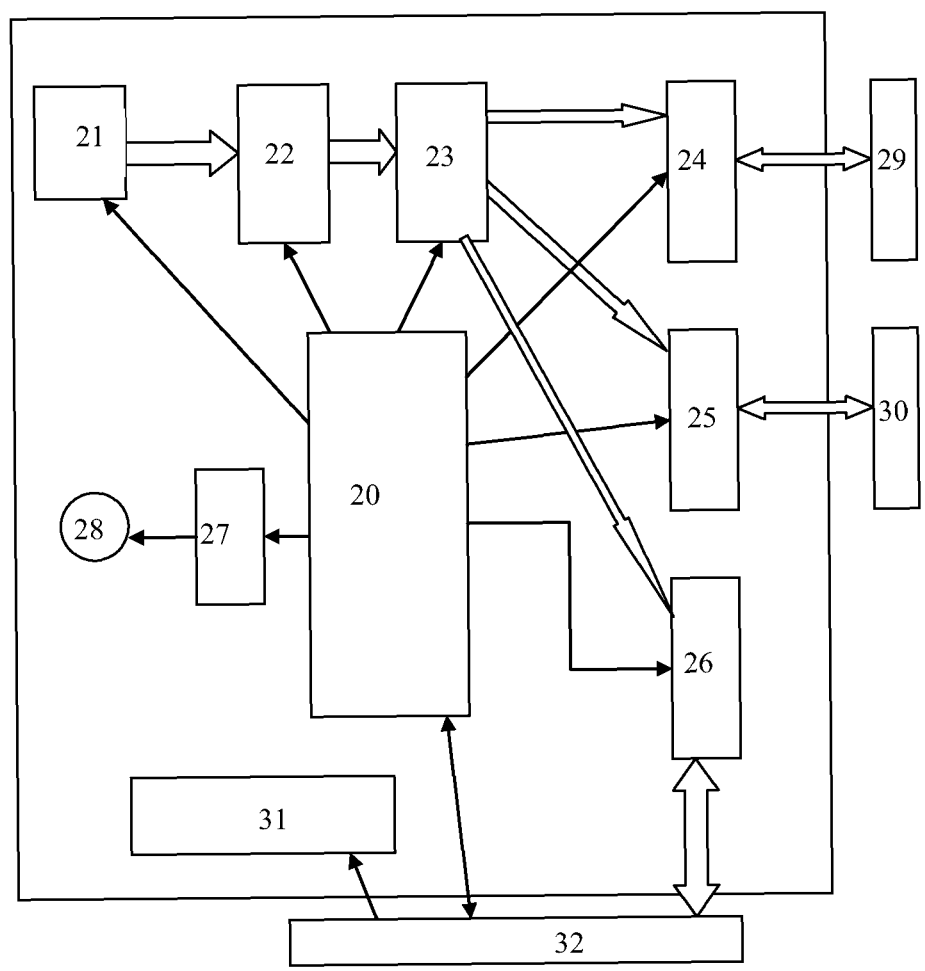
FIG. 7 shows a function block diagram of the sheet-fed scanner.

FIG. 7 is a function block diagram of a scanner according to the present invention.

The processor (20) controls the operation of the scanner. The Contact Image Sensors (CIS) (21) comprise a linear array of detectors, covered by a focusing lens and flanked by LEDs for illumination. The CIS converts a line of the scanned document into an analog signal. An analog/digital converter (22) converts the analog signal into digital values. An image compressor (23) produces a JPEG compressed image. This image is saved on the external memory card by means of the card memory controller (24) and memory card connector (29), or is saved on the external memory stick by means of the memory stick USB controller (25) and USB memory connector (30), or is saved on the local memory (26). The local memory can be accessed by a computer by the USB connector to host (32).

The paper is moved by a paper feeder step motor (28) controlled by a motor controller (27).

The rechargeable battery (31) provides the power for the different elements of the scanner. The battery can be charged with the USB power charge connector (32) coupled with the USB connector to host.

The scanner shown in FIG. 7 may be coupled with an OCR application residing on a computer. This OCR application converts the JPEG images into text and output the result into different formats such as HTML, RTF, WORDX, PDF, . . . .

The scanner processor determines the folder names and the file names given to the JPEG files in the local memory (or USB memory stick, or memory card). Those names have pre-determined prefixes that can be recognized later by the OCR application residing on the computer. Indeed, when the local memory (or USB memory stick, or memory card) is connected to the computer, it is automatically mounted as a standard memory device and the OCR application will search for JPEG files having the pre-determined prefixes. The OCR application can thus independently (or interactively by asking OCR settings to the user) convert the selected JPEG files into the output format.

The scanner shown in FIG. 7. could also be equipped, in alternative embodiments, with an image digital processor with functions to enhance the image quality known to the person skilled in the art such as image color correction, image de-noising, image sharpening, image cropping etc.

The scanner shown in FIG. 7 is equipped with a JPEG compressor. In alternative embodiments, the scanner could also be equipped with another image compressor known to the person skilled in the art, such as JPEG2000, JPEG XR, etc. It could also be equipped by the iHQC compressor of I.R.I.S. SA (patent application US2008273807 A1) or another document hyper-compressor intended to highly compress documents that contain text and images. It could also be equipped with a PDF or XPS image wrapper.

The scanner shown in FIG. 7 is equipped with a processor. In alternative embodiments, the scanner could also be equipped with a microcomputer (microprocessor, an Operating System, ROM and RAM) to execute embedded programs known to the person skilled in the art such as an OCR program performing text recognition and creating a searchable PDF or XPS file, a program to auto-orientate the document image, an automatic classification based on the paper size (e.g. between business card or invoice), an automatic identification (e.g. by using the Fingerprint™ technology from I.R.I.S. SA) of the document type (e.g. form types). Each document type would then be associated with a pre-determined folder prefix.

The scanner shown in FIG. 7 can also be equipped in alternative embodiments with a keyboard and display device (or other input/output device). Those devices could be used to enter or select image processing types and parameters known to the person skilled in the art, such color correction, image de-noising, image sharpening, etc. Those devices could be used to enter or select compression parameters known to the person skilled in the art, such as the type of compression, the compression quality factor.

The scanner shown in FIG. 7 could be equipped, in alternative embodiments, with a Bluetooth adapter, Wi-Fi adapter or another wireless adapter that can be used, in a manner known to the person skilled in the art, to transfer the image files from the scanner local memory to a network drive.

The scanner shown in FIG. 7 is equipped for connecting a USB stick and SD/xD/MMC/MS memory card. In alternative embodiments, the scanner could also be equipped for connecting other types of storage media known to the person skilled in the art, such as for example a portable disk storage, a Compact Flash card, a micro SD card, etc. and/or multiple storage media of the same type.

The scanner shown in FIG. 7 is equipped with a local rechargeable battery. In alternative embodiments, the scanner could also be equipped with other types of battery known to the person skilled in the art, such as for example a removable battery.

The scanner shown in FIG. 7 is equipped with a USB power charge connector. In alternative embodiments, the scanner could also be equipped with other types of power charge connector known to the person skilled in the art, such as for example a power supply port.

The scanner shown in FIG. 7 is coupled with an OCR application residing on a computer. In alternative embodiments, the scanner could also be coupled with other software applications known to the person skilled in the art, such as for example Business card recognition software, invoice recognition software, document management software, etc.

The scanner shown in FIG. 7 coupled with a software application residing on a computer may be also equipped, in alternative embodiments, with a keyboard and display device (or other input/output devices) that allow a user to enter or select pre-determined prefixes for folder names and file names. The same pre-determined prefixes can also be selected by the user in the software application so that only the JPEG files corresponding to those prefixes will be processed by the software application. Those prefixes can also be pre-determined to represent the document types (business letter, business card, invoice, form, . . . ) or document characteristics (such as for example the language). The software application will then interpret the prefixes and select the operations (with the proper settings) to be performed on the document.

The scanner shown in FIG. 7 coupled with a software application residing on a computer can also be equipped, in alternative embodiments, with a keyboard and display device (or other input/output device) that allow a user to select tags that will be inserted in the image files. Those tags can also be pre-determined to represent the document types (business letter, business card, invoice, form, . . . ) or document characteristics (such as for example the language). The software application will then interpret the tags and select the operations (with the proper settings) to be performed on the document.

Figure 8:
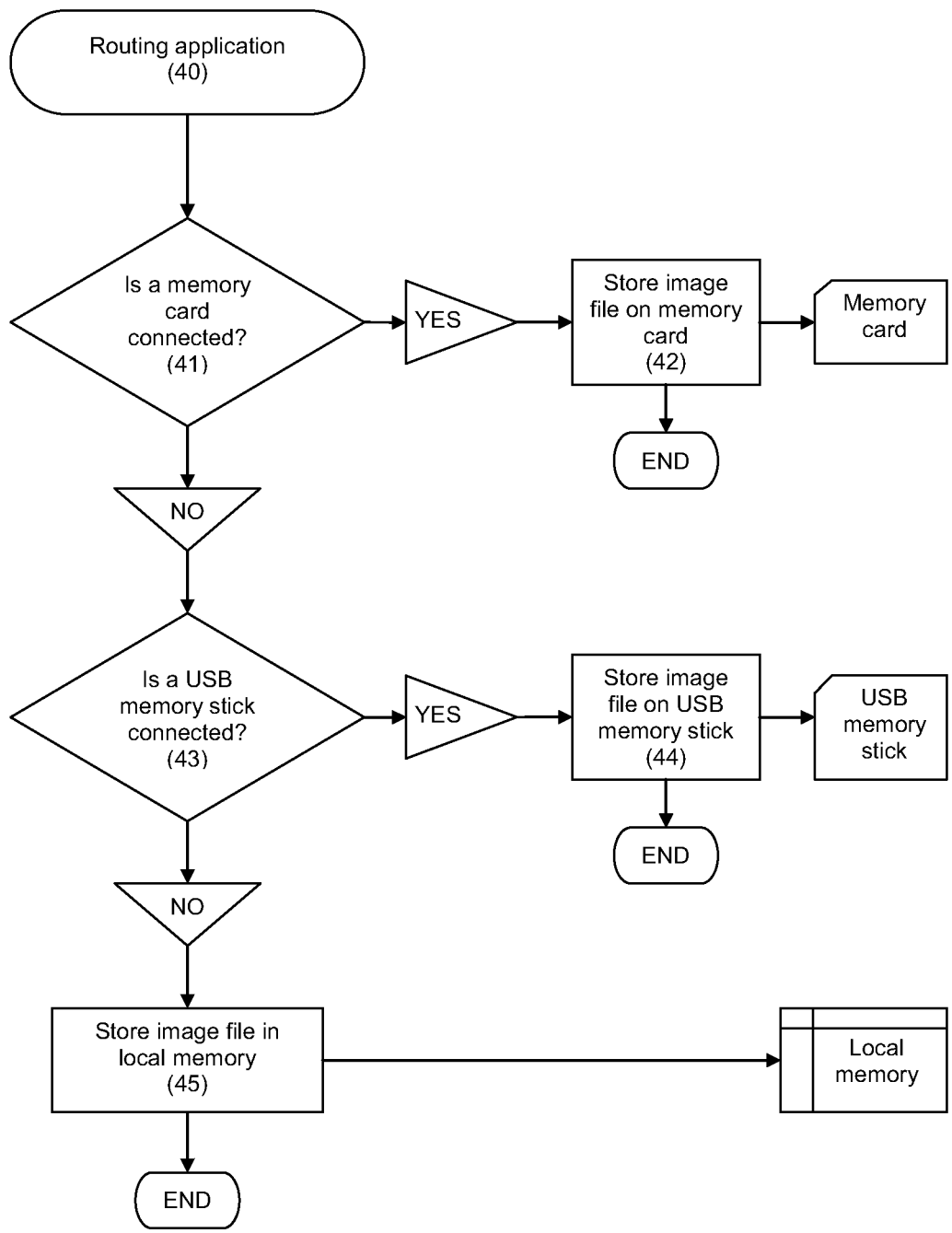
FIG. 8 shows the flowchart of the embedded routing application of the scanner.

FIG. 8 shows the flowchart of the embedded routing application of the scanner (40) that determines on which memory media to store a scanned image file. The application searches first for a connected memory card (41). If a connected memory card is found, the image file is stored on this memory card (42). If not, the application searches for a connected USB memory stick (43). If a connected USB memory stick is found, the image file is stored on the USB memory stick (44). If not the image file is stored in the local memory (45).

In alternative embodiments, the embedded routing application could use the result of a classification or identification program executed (described previously) on the microcomputer of the scanner to determine on which memory media to store the scanned.

The invention claimed is:

1. Battery-powered portable sheet-fed scanner, comprising:
    a scanning unit for scanning documents and forming digital representations thereof;
    a sheet feeder for feeding a document past the scanning unit;
    a processor, communicatively connected to the scanning unit and provided for controlling the scanning operation; and
    a plurality of embedded storage capabilities, each of which is communicatively connected to the processor and each of which comprises either an internal memory for internally storing the digital representations or a communication link to an external storage medium for externally storing the digital representations;
    wherein the processor is provided with an embedded OCR application provided for detecting text in the digital representations and thus providing detected text which can be stored together with the digital representation;
    wherein the processor is provided with an embedded routing application which is provided for routing each of the digital representations to a predetermined selection among the embedded storage capabilities and making said predetermined selection on the basis of the text detected in the respective digital representation; and
    wherein said embedded OCR and routing applications are in a format executable on the processor of the scanner itself, such that the scanner is usable as an autonomous device.

2. Battery-powered portable sheet-fed scanner according to claim 1, wherein the plurality of embedded storage capabilities comprise two or more of the following: an internal flash memory, one or more interfaces for connecting a peripheral storage medium, one or more wireless communication links for wirelessly communicating the digital representations towards a remote storage medium.

3. Battery-powered portable sheet-fed scanner according to claim 2, wherein one of the interfaces is a USB port for receiving a USB memory device.

4. Battery-powered portable sheet-fed scanner according to claim 2, wherein one of the interfaces is a slot for receiving an SD card.

5. Battery-powered portable sheet-fed scanner according to claim 2, wherein one of the wireless communication links comprises a Bluetooth transceiver.

6. Battery-powered portable sheet-fed scanner according to claim 2, wherein one of the wireless communication links comprises a wi-fi transceiver.

7. Battery-powered portable sheet-fed scanner according to claim 2, wherein one of the wireless communication links comprises a cellular network transceiver.

8. Battery-powered portable sheet-fed scanner according to claim 1, wherein the predetermined selection of the embedded routing application is further made on the basis of a user identity.

9. Battery-powered portable sheet-fed scanner according to claim 1, wherein the predetermined selection of the embedded routing application is further made on the basis of a document type and/or size.

10. Battery-powered portable sheet-fed scanner according to claim 1, wherein the predetermined selection of the embedded routing application is further made on the basis of a hierarchy among the available storage capabilities.

11. Battery-powered portable sheet-fed scanner according to claim 1, wherein the embedded routing application is adapted for routing the digital representations in a retraceable manner, such that afterwards the selection of where to store the digital representations is retrievable.

12. Battery-powered portable sheet-fed scanner according to claim 11, wherein the embedded routing application is adapted for tagging the digital representations.

13. Battery-powered portable sheet-fed scanner according to claim 1, wherein the processor is provided for storing preferences relating to the scanning operation.

14. Battery-powered portable sheet-fed scanner according to claim 1, wherein said OCR application is comprised in an embedded application to perform document hyper compression, being in a format executable on the processor of the scanner itself and provided for generating from said digital representations sophisticated document formats which contain both a compressed image and the detected text.

15. Computer system comprising a battery-powered portable sheet-fed scanner and a computer device, wherein the battery-powered portable sheet-fed scanner comprises:
    a scanning unit for scanning documents and forming digital representations thereof;
    a sheet feeder for feeding a document past the scanning unit;
    a plurality of embedded storage capabilities, each of which is communicatively connected to the processor and each of which comprises either an internal memory for internally storing the digital representations or a communication link to an external storage medium for externally storing the digital representations, wherein at least one of the embedded storage capabilities comprises an interface for connecting a removable storage medium; and
    a processor, communicatively connected to the scanning unit and provided for controlling the scanning operation,
    wherein the processor is provided with an embedded OCR application provided for detecting text in the digital representations and thus providing detected text which can be stored together with the digital representation;
    wherein the processor is provided with an embedded routing application which is provided for routing each of the digital representations to a predetermined selection among the embedded storage capabilities and making said predetermined selection on the basis of the text detected in the respective digital representation; and
    wherein said embedded OCR and routing applications are in a format executable on the processor of the scanner itself, such that the scanner is usable as an autonomous device;

and wherein the computer device is provided with a document scanning application executable on the computer device, the document scanning application having wake up capabilities for detecting connection of the removable storage medium, containing digital representations scanned by means of the scanner, to the computer device.

* * * * *